July 9, 1963      G. A. JENKINS      3,096,659
REVERSIBLE RATCHET MECHANISM
Filed Jan. 30, 1961      2 Sheets-Sheet 1
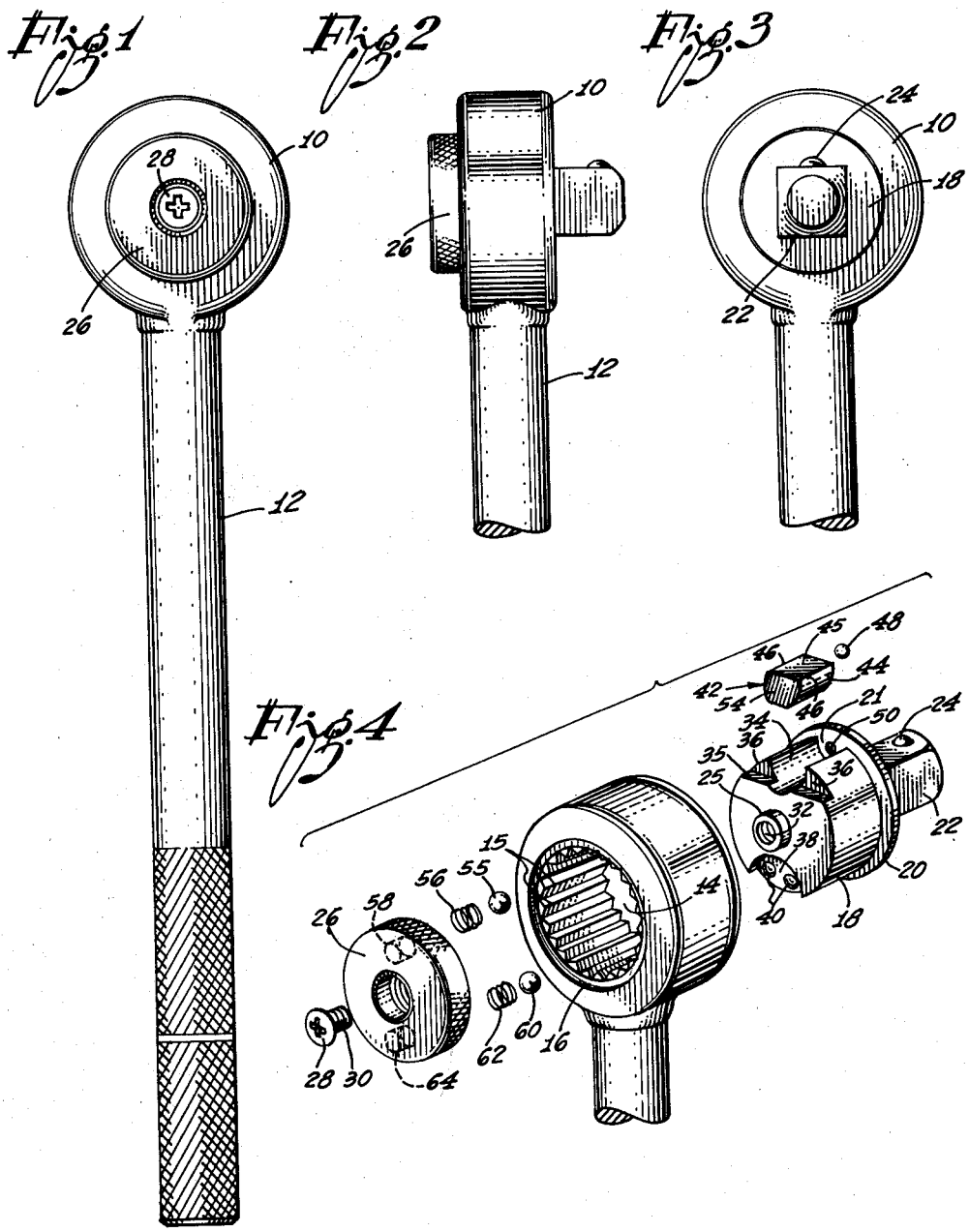
INVENTOR:
George A. Jenkins
By Smyth, Roston & Pavitt
Attorneys.

July 9, 1963  G. A. JENKINS  3,096,659
REVERSIBLE RATCHET MECHANISM
Filed Jan. 30, 1961  2 Sheets-Sheet 2
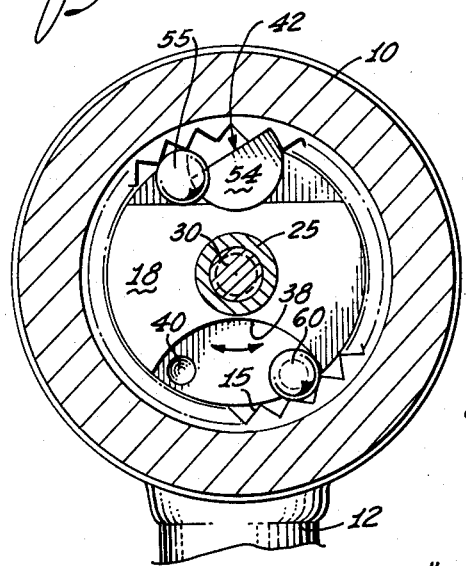
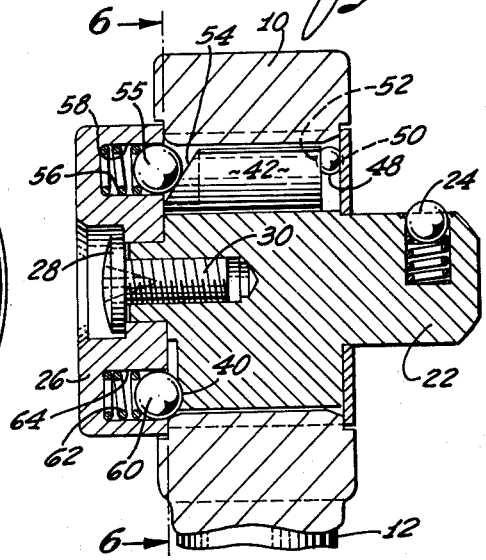
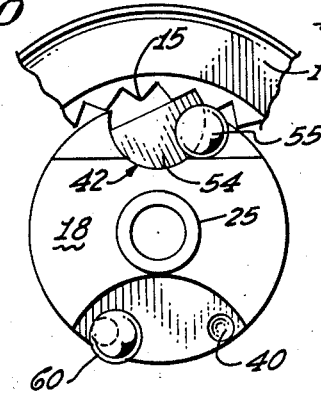
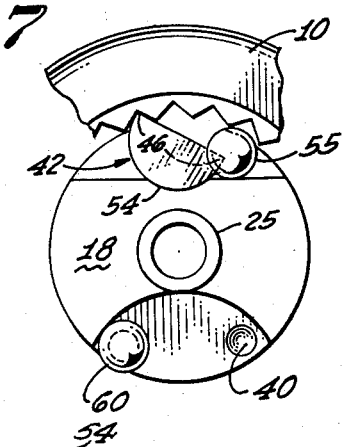
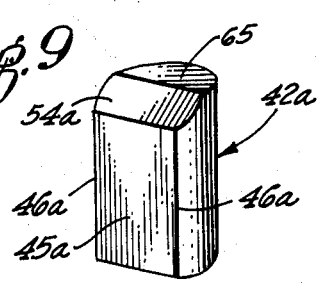
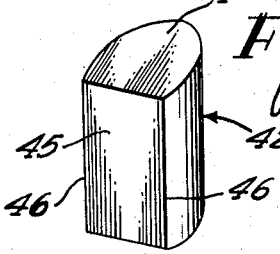
INVENTOR:
George A. Jenkins
Smyth, Roston & Pavitt
Attorneys.

United States Patent Office 3,096,659
Patented July 9, 1963

3,096,659
REVERSIBLE RATCHET MECHANISM
George A. Jenkins, Glendora, Calif., assignor to George C. Jenkins, San Gabriel, Calif.
Filed Jan. 30, 1961, Ser. No. 85,862
5 Claims. (Cl. 74—157)

This invention relates to a ratchet mechanism for unidirectional rotation of a driven member by a drive member and, more particularly, refers to such a ratchet mechanism that is reversible.

While the invention is broadly applicable in various fields for various specific purposes, the invention has been initially embodied as a reversible hand wrench. This initial embodiment of the invention has been selected for the present disclosure, and will provide adequate guidance for those skilled in the art who may have occasion to apply the same principles to other types of devices.

One problem to which the invention is directed is to provide a rugged ratchet structure that is capable of carrying high torque loads. Another problem is to provide a ratchet mechanism of durable construction capable of a long service life with minimum care. A third problem is to provide a ratchet mechanism that is of simple construction with relatively few working parts.

In general, these problems are solved by the combination of an inner body of circular cross-section having a longitudinal peripheral recess, an outer annular body surrounding and journaling the inner body, the outer body having an inner circumferential series of longitudinal ratchet teeth and a pawl in the form of a body journaled in the longitudinal recess of the inner body for releasable engagement with the ratchet teeth. Either the inner or outer annular body can be the drive member, the other body being the driven member. In the preferred practice of the invention the outer body is the drive member and for this purpose is provided with a radial handle in a well-known manner. The pawl is spring-biased for unidirectional engagement with the teeth and is reversible between two alternate angular positions.

The fact that such a ratchet mechanism is capable of carrying exceptionally high torque loads may be appreciated when it is considered that the interior of the annular drive body is substantially fully occupied by solid metal. The inner driven member is a solid metal body that spans the inside diameter of the outer annular drive member, the only interior space left being the space provided by the longitudinal peripheral recess of the driven body.

This recess is of cylindrical curvature and the pawl body is of similar cylindrical curvature to journal in the recess and to occupy substantially the whole volume of the recess. Thus, when the pawl is rotated into engagement with a ratchet tooth, it engages the ratchet tooth along a substantial longitudinal dimension of the ratchet tooth and the pawl backs against the peripheral recess of the inner driven member along an extensive longitudinal dimension of the inner driven member.

These relatively extensive longitudinal dimensions along which torque forces are transmitted between the drive member and the driven member result in extensive longitudinal distribution of the stress and avoid undue stress concentration. The resulting low unit stress is easily carried by the relatively massive pawl body and especially so because the stress is diametrically of the pawl; the relatively low unit stress is easily carried by the longitudinally extensive teeth of the outer drive body; and, of course, the massive solid inner driven body has even greater capacity for withstanding tremendous loads.

With reference to durable and long service life with minimum wear, here again, the extensive longitudinal dimensions of the three cooperating parts are all important in that the surfaces subjected to wear are correspondingly extended. A further feature of the invention in this regard is that the longitudinal edges of the pawl body that engage the ratchet teeth in the two directions of operation need not be sharp edges for proper functioning, and in fact are far from sharp edges. The surfaces of the pawl body that form these teeth-engaging edges converge at an angle of more than 90° instead of a relatively sharp, acute angle. Relatively blunt pawl edges are, of course, less subject to wear than sharp pawl edges.

In ratchet mechanisms of conventional types the continually repeated pivotal movement of the pawl involves concentration of wear at the pivotal mounting of the pawl. In the present invention the wear that is involved in the oscillation of the pawl is distributed over an outer surface of the pawl that is extensive both longitudinally and circumferentially.

The simplicity of the ratchet construction may be readily appreciated. The three cooperating bodies are of simple shapes and may be readily fabricated in mass production. Simplicity is achieved by journaling the cylindrically curved pawl body in the cylindrically curved recess whereby the usual pawl pivot is omitted. As will be explained, a further feature of the invention with regard to simplicity is that a single means is employed for spring-biasing the pawl at its two alternate positions and, moreover, this single spring-pressed biasing means is also employed for rotating the pawl from one of its two operating positions to the other when the ratchet direction is reversed.

The various features and advantages of the invention may be understood by reference to the following detailed description and the accompanying drawings.

In the drawings, which are to be regarded as merely illustrative:

FIG. 1 is a plan view of the presently preferred embodiment of the reversible ratchet wrench;

FIG. 2 is a fragmentary side elevation of the wrench;

FIG. 3 is a fragmentary bottom view of the wrench;

FIG. 4 is an exploded perspective view showing the various components of the wrench structure;

FIG. 4a is a perspective view of the pawl shown in FIG. 4;

FIG. 5 is an enlarged diametrical section through the head of the wrench;

FIG. 6 is a sectional view taken along the line 6—6 of FIG. 5;

FIG. 7 is a fragmentary view similar to FIG. 6 showing the pawl turned to an alternate position;

FIG. 8 is a similar view illustrating the manner in which the pawl makes the transition from the position shown in FIG. 6 to the position shown in FIG. 7; and FIG. 9 is a perspective view of a modified pawl that may be used.

The ratchet wrench shown in the drawings has a drive member in the form of an annular or cylindrical head 10 integral with an elongated handle 12, the annular head having a central opening or axial bore 14 that is formed with longitudinal ratchet teeth 15. The ratchet teeth 15 are preferably of symmetrical cross-section, the cross-sectional configuration being that of an isosceles triangle whereby each ratchet tooth has two equal and opposite ratchet faces. The axial bore 14 is slightly counterbored at its opposite ends to form rim recesses 16, one of which is shown in FIG. 4.

Journaled in the drive member 10 is a driven member 18 in the form of a solid metal body of circular cross-sectional configuration. The driven member 18 has a radial flange 20 that rotatably seats in one of the rim recesses 16. To simplify fabrication, the radial flange 20 may be provided by brazing or otherwise bonding a washer 21 to the body of the driven member.

The driven member 18 is further formed with an axial extension 22 of square cross-section to receive a socket fitting (not shown) in a well-known manner. The axial extension 22 is provided with the usual spring-pressed detent ball 24 for making releasable engagement with the socket fitting.

The driven member 18 is further formed with a hub portion 25 for mounting a reversing cap 26, the reversing cap being rotatable relative to the driven member. The reversing cap 26 is bored to receive the hub portion 25 and is counterbored to receive the head 28 of a screw 30. The reversing cap seats in the corresponding rim recess 16 of the driven member and the screw 30 threads into an axial bore 32 of the driven member 18 to hold the assembly together.

The driven member 18 is formed with a longitudinal recess 34 that terminates at the washer 21, the washer forming an end wall of the recess. The second end of the longitudinal recess 34 opens on a transverse recess 35 that provides a pair of shoulders 36 on opposite sides of the longitudinal recess. The same end of the driven member 18 is formed with another recess 38 that is diametrically opposite from the transverse recess 35. The recess 38 is formed with a pair of circumferentially spaced detent sockets 40.

A pawl 42 in the form of a solid block of metal of the configuration shown in FIG. 4a extends longitudinally of the driven member 18 and is rotatably mounted in longitudinal recess 35 for rotation of the pawl on its longitudinal axis. In the construction shown, the longitudinal recess 38 of the driven member 18 is cylindrically curved with the extent of the curvature more than 180° and the pawl 42 has a cylindrically curved peripheral surface for snug rotary fit in the longitudinal recess. The solid metal pawl 42 has a longitudinal portion removed therefrom to form a flat longitudinal face 45 and two spaced longitudinal edges 46, the purpose of the longitudinal edges 46 being to cooperate alternately with the ratchet teeth 15.

In the construction shown the flat face 45 is less than a diametrical face, the circumferential extent of the cylindrically curved peripheral surface of the pawl exceeding 180°. One advantage of these proportions is that the longitudinal edges 46 of the pawl are relatively blunt since each edge is formed by two surfaces that meet at an angle of more than 90°. Another advantage is that the load is transmitted across the diameter of the pawl so that the pawl has the strength of a solid cylinder of metal under diametrical compression. The shape and dimensions of the pawl 42 and the ratchet teeth 15 are such that the pawl may assume one rotary position with one of its longitudinal edges 46 effectively engaging a ratchet tooth, as shown in FIG. 7, or may be rotated to an alternate position with the other longitudinal edge engaging a ratchet tooth with equal effectiveness, as shown in FIG. 8.

Preferably, a small ball 48 positioned on the axis of the pawl 42 is interposed between the washer 21 and the corresponding end of the pawl to serve as a thrust bearing. Either the washer or the pawl may be recessed to form a socket for the ball 48. Preferably, both are recessed, the washer being formed with a socket 50 for the ball and the pawl being formed with a socket 52.

The second end of the pawl 42 is formed with an inclined cam face 54 for cooperation with an actuating ball 55 that is under pressure from a coil spring 56, said cam face intersecting the axis of oscillation of the pawl. The coil spring 56 is seated in a blind bore 58 in the reversing cap 26 and the actuating ball 55 normally partially positioned in the blind bore, the ball protruding from the blind bore in pressure contact with the cam face 54. The pressure of the spring-pressed ball 55 against the cam face 54 is parallel with the axis of oscillation of the pawl and the inclination of the cam face results in a radial force component that tends to back the pawl in its seat against the journalling driven member 18. In this embodiment of the invention the cam face 54 is symmetrical with respect to the longitudinal flat face 45, both faces being perpendicular to a common longitudinal plane through the axis of rotation of the pawl.

At one of the two alternate positions of the pawl 42 which is shown in FIG. 6, the actuating ball 55 is at one side of the cam face 54 to urge the pawl in a counterclockwise direction so that the rightward longitudinal edge 46 of the pawl is yieldingly urged into engagement with the ratchet teeth 15. If the annular head 10 of the wrench is now shifted clockwise by the handle 12, the ratchet teeth will move past the pawl 42 with a clicking action, the pawl being rotatably oscillated in resistance to the yielding pressure of the actuating ball 55. If the annular head 10 is rotated counterclockwise relative to the pawl 42, the pawl will lock against a ratchet tooth 15 to force the driven member 18 to rotate counterclockwise with the annular member. It can be seen in FIG. 6 that the reaction force on the locked pawl is diametrical of the pawl and, therefore, does not create any tendency for the pawl to rotate on its axis.

On the other hand, if the actuating ball 55 is adjacent the right side of the cam face 54, as shown in FIG. 7, the drive member 10 may be rotated counterclockwise independently of the driven member 18 with a clicking action of the pawl, but the pawl will lock against a ratchet tooth to drive the driven member 18 if the drive member is rotated clockwise.

FIG. 8 indicates in phantom successive positions of the actuating ball 55 when the reversing cap is rotated to shift the actuating ball rightward from the operating position shown in FIG. 6 to the alternate operating position shown in FIG. 7. During the initial portion of this rightward movement of the actuating ball 55 the pawl remains in its position facing leftward, as shown in solid lines in FIG. 7. After the ball crosses the axis of the pawl, however, it exerts a cam force that tends to rotate the pawl clockwise to the reverse position shown in FIG. 7. This clockwise torque increases progressively as the ball passes beyond the axis and causes the pawl to rotate with a snap action to the rightwardly facing position shown in FIG. 7. Thus, the reversing cap 26 may be oscillated through a relatively small angle to reverse the operating position of the pawl 42, the angle being approximately the angle from the axis of the driven member 18 that is subtended by the pawl.

Any suitable detent means may be employed to yieldingly maintain the reversing cap 26 at its two alternate positions. In the present embodiment of the invention a detent ball 60 cooperates with the two previously mentioned detent sockets 40 for this purpose. The detent ball 60 is under pressure from a coil spring 62, the coil spring being mounted in a second blind bore 64 in the reversing cap with the detent ball protruding from the blind bore. The two blind bores 58 and 64 for the two spring-pressed balls are diametrically opposite from each other.

FIG. 9 shows a slight modification of the pawl. The pawl 42a shown in FIG. 9 is identical with the previously described pawl 42 but the cam face 54a of the pawl is relatively short, the pawl having an end face 65 adjacent the cam face. This pawl operates in the same manner as the first described pawl.

The manner in which the invention functions to serve its purpose may be readily understood from the foregoing description. At either of the two alternate positions of the pawl 42 as determined by manipulation of the reversing cap 26, the actuating ball 55 under pressure from the coil spring 56 presses against the cam face 54 adjacent one of the side edges of the pawl, the actuating ball being also in contact with an adjacent shoulder 36. This pressure creates a yielding torque on the pawl by cam action to urge the pawl into engagement with the ratchet teeth, the pawl permitting relative rotation between the drive member and the driven member in one rotary direction and locking to prevent relative rotation in the other direction. To reverse the direction of the ratchet action, the reversing cap is rotated through the small angle from one of its limit positions to the other.

The ruggedness of the construction may be readily appreciated in that the pawl body is a solid block of metal of substantial mass with relatively long edges, and from the further fact that the ratchet teeth are correspondingly long. The relative bluntness of the longitudinal edges of the pawl together with their exceptional length distributes wear, and the extensive cylindrical areas involved in the journaling of the pawl in the driven member further facilitates wear. The freedom for rotation of the actuating ball and the detent ball also distributes wear. The small ball that serves as a thrust bearing at one end of the pawl not only reduces wear but also minimizes frictional resistance to rotation of the pawl.

My description in specific detail of the selected embodiment of the invention will suggest various changes, substitutions, and other departures from my disclosure within the spirit and scope of the appended claims.

I claim:
1. A reversible ratchet mechanism comprising:
   an inner member of generally circular cross section;
   an outer annular member surrounding and journalling said inner member, said outer member having an inner circumferential series of teeth, one of said members being a drive member, the other of the two members being a driven member,
   said inner member being formed with a cylindrically curved recess on its outer circumference with the axis of cylindrical curvature parallel with the axis of rotation of the inner member,
   a pawl in the form of a body of the same cylindrical curvature as said recess peripherally cut away to form a longitudinal side, said pawl having two opposite engagement portions on opposite sides of said longitudinal side for alternate engagement with said teeth,
   said pawl being journalled by said recess and backed against said inner member with said longitudinal side facing outwardly from the axis of the inner member to oscillate between one operating position at which one of said two engagement portions cooperates with said teeth to prevent relative rotation in one direction between the inner and outer members, and an alternate operating position at which the other of said two engagement portions cooperates with said teeth to prevent relative rotation in the opposite direction between the inner and outer members,
   and reversing means to place and yieldingly maintain said pawl at said two operating positions selectively, said reversing means including a cam surface on one end of the pawl and a spring-pressed follower exerting pressure on said cam surface in a direction parallel to the axis of rotation of the pawl.

2. A combination as set forth in claim 1 in which said cam surface is inclined relative to the axis of rotation of the pawl at an angle to cause said spring-pressed follower to create a component of force radially of the pawl in a direction to urge the pawl against said inner member.

3. A reversible ratchet mechanism comprising:
   an inner member of generally circular cross section;
   an outer annular member surrounding and journalling said inner member, said outer member having an inner circumferential series of teeth, one of said members being a drive member, the other of the two members being a driven member,
   said inner member being formed with a cylindrically curved recess on its outer circumference with the axis of cylindrical curvature parallel with the axis of rotation of the inner member,
   a pawl in the form of a cylindrical body of the same cylindrical curvature as said recess peripherally cut away to form a longitudinal side, said pawl having two opposite engagement portions on opposite sides of said longitudinal side for alternate engagement with said teeth,
   said pawl having a single cam face at one end inclined towards the opposite end;
   a reversing member journalled on said inner member for oscillation relative thereto between two alternate positions; and
   a spring-pressed follower carried by said reversing member eccentrically of its axis of rotation and exerting pressure on said cam face for reversing the pawl and for yieldingly urging the pawl into engagement with said teeth, said follower exerting pressure substantially parallel with the axis of rotation of the pawl to create a force component for urging the pawl against the inner member.

4. A combination as set forth in claim 3 which includes detent means to yieldingly maintain said reversing member at its alternate positions.

5. A combination as set forth in claim 1 in which said spring-pressed follower is a ball pressing against one end of the pawl and which includes a second ball at the other end of the pawl on the axis of rotation of the pawl serving as a thrust bearing for the pawl.

References Cited in the file of this patent

UNITED STATES PATENTS

| | | |
|---|---|---|
| 1,072,807 | Ayer | Sept. 9, 1913 |
| 1,854,513 | Hummel | Apr. 19, 1932 |
| 2,020,883 | Gagne | Nov. 12, 1935 |
| 2,407,558 | Kress | Sept. 10, 1946 |
| 2,544,795 | Knudsen | Mar. 13, 1951 |
| 2,554,990 | Kilness | May 29, 1951 |
| 2,620,051 | Kaplan | Dec. 2, 1952 |
| 2,686,582 | Odlum et al. | Aug. 17, 1954 |
| 2,706,424 | Johnson | Apr. 19, 1955 |
| 2,772,763 | Johnson | Dec. 4, 1956 |